(12) United States Patent
Crumley

(10) Patent No.: US 10,280,963 B2
(45) Date of Patent: May 7, 2019

(54) SYSTEM AND METHOD FOR RETROFITTING WALLS WITH RETAINING TIES

(71) Applicant: Harvel K. Crumley, Jacksonville Beach, FL (US)

(72) Inventor: Harvel K. Crumley, Jacksonville Beach, FL (US)

( * ) Notice: Subject to any disclaimer, the term of this patent is extended or adjusted under 35 U.S.C. 154(b) by 0 days.

(21) Appl. No.: 15/082,640

(22) Filed: Mar. 28, 2016

(65) Prior Publication Data

US 2016/0208508 A1    Jul. 21, 2016

Related U.S. Application Data

(62) Division of application No. 14/603,952, filed on Jan. 23, 2015, now Pat. No. 9,297,176.

(Continued)

(51) Int. Cl.
| | |
|---|---|
| *E04B 2/16* | (2006.01) |
| *E04C 5/12* | (2006.01) |
| *F16B 31/02* | (2006.01) |
| *E04G 23/02* | (2006.01) |
| *E04B 2/20* | (2006.01) |

(Continued)

(52) U.S. Cl.
CPC .............. *F16B 31/028* (2013.01); *E04B 1/40* (2013.01); *E04B 1/98* (2013.01); *E04B 2/16* (2013.01); *E04B 2/20* (2013.01); *E04C 1/00* (2013.01); *E04C 1/39* (2013.01); *E04C 5/08* (2013.01); *E04C 5/125* (2013.01); *E04G 21/12* (2013.01); *E04G 23/0218* (2013.01); *E04G 23/0229* (2013.01); *E04H 9/021* (2013.01); *E04H 9/027* (2013.01); *E04H 9/14* (2013.01); *E04B 2002/0254* (2013.01); *E04B 2103/02* (2013.01)

(58) Field of Classification Search
CPC . E04G 23/0229; E04G 21/12; E04G 23/0218; E04G 23/0222; E04H 9/027; E04H 9/14; E04H 9/021; E04C 1/00; E04C 5/08; E04C 5/16; E04C 5/125; F16B 31/028; E04B 2/20; E04B 2103/02; E04B 1/98; E04B 2002/0254; E04B 2/16; E04B 2/30; E04B 2/34
USPC ..... 52/741.1, 741.14, 741.15, 742.1, 742.13, 52/742.14, 698, 514, 514.5
See application file for complete search history.

(56) References Cited

U.S. PATENT DOCUMENTS 1,320,259 A * 10/1919 Martens .................. F16B 39/24
238/349
1,963,535 A * 6/1934 Trotter .................... F16B 39/24
411/149

(Continued)

OTHER PUBLICATIONS

Office Action dated Mar. 31, 2015 in U.S. Appl. No. 14/603,530.
(Continued)

*Primary Examiner* — Ryan D Kwiecinski
(74) *Attorney, Agent, or Firm* — Stephen E. Kelly; Hill Ward Henderson, P.A.

(57) ABSTRACT

A retention tie system for post-construction installation to stabilize masonry or composite walls. The system comprises a tie member anchored in an anchor hole bored into the existing foundation and a tensioned against a base plate and a cover plate seated along the top of the wall. A bracing member is used to provide lateral stability to the respective plate members. A tension washer is used to ensure that the tie members are tensioned to the appropriate load.

4 Claims, 16 Drawing Sheets

Related U.S. Application Data

(60) Provisional application No. 61/930,819, filed on Jan. 23, 2014.

(51) Int. Cl.
    *E04C 1/00*    (2006.01)
    *E04H 9/02*    (2006.01)
    *E04G 21/12*    (2006.01)
    *E04B 1/98*    (2006.01)
    *E04C 1/39*    (2006.01)
    *E04H 9/14*    (2006.01)
    *E04B 1/41*    (2006.01)
    *E04C 5/08*    (2006.01)
    *E04B 2/02*    (2006.01)

(56) References Cited

U.S. PATENT DOCUMENTS

| | | | | |
|---|---|---|---|---|
| 2,369,687 | A * | 2/1945 | Ralston | E04B 1/2608 296/30 |
| 2,850,937 | A * | 9/1958 | Ralston | E21D 21/02 116/DIG. 34 |
| 3,037,221 | A * | 6/1962 | Lanius, Jr. | B23P 19/08 29/511 |
| 3,109,260 | A * | 11/1963 | De Cesare | E04B 1/41 52/300 |
| 3,141,182 | A * | 7/1964 | Lanius, Jr. | B21K 1/64 29/512 |
| 3,150,557 | A * | 9/1964 | Brown | E21D 21/0086 411/9 |
| 3,190,333 | A * | 6/1965 | Lanius, Jr. | F16B 39/24 411/134 |
| 3,256,030 | A * | 6/1966 | Banse | E04B 1/2608 248/300 |
| 3,323,403 | A * | 6/1967 | Waisman | F16B 31/028 411/10 |
| 3,352,344 | A * | 11/1967 | Lanius, Jr. | F16B 39/24 411/145 |
| 3,434,520 | A * | 3/1969 | Bedford, Jr. | F16B 39/24 411/134 |
| 3,474,701 | A * | 10/1969 | Setzler | F16B 31/028 411/8 |
| 3,495,907 | A * | 2/1970 | Rogers | F16B 31/028 356/34 |
| 3,813,835 | A * | 6/1974 | Rice | E04B 1/34823 52/223.7 |
| 3,992,974 | A * | 11/1976 | Miki | F16B 31/028 411/544 |
| 4,020,734 | A * | 5/1977 | Bell | F16B 31/028 411/10 |
| 4,072,081 | A * | 2/1978 | Curtis | F16B 31/028 411/10 |
| 4,149,446 | A * | 4/1979 | Spengler | F16B 31/028 411/11 |
| 4,164,164 | A * | 8/1979 | Trungold | F16B 31/028 411/10 |
| 4,292,876 | A * | 10/1981 | De Graan | F16B 43/001 411/369 |
| 4,303,001 | A * | 12/1981 | Trungold | F16B 31/028 411/10 |
| 4,307,550 | A * | 12/1981 | Behar | B28B 23/04 24/136 R |
| 4,347,024 | A * | 8/1982 | Coldren | F16B 31/028 411/11 |
| 4,410,294 | A * | 10/1983 | Gilb | E04B 1/2612 403/232.1 |
| 4,452,028 | A * | 6/1984 | Norton | E02D 37/00 52/295 |
| 4,572,695 | A * | 2/1986 | Gilb | E04B 1/2608 248/300 |
| 4,714,372 | A * | 12/1987 | Commins | E04B 1/2608 403/346 |
| 4,726,567 | A * | 2/1988 | Greenberg | E04B 2/16 256/19 |
| 4,750,306 | A * | 6/1988 | Granieri | E02D 27/50 52/251 |
| 4,757,656 | A * | 7/1988 | Powers, Jr. | E04C 3/02 52/204.2 |
| 4,821,483 | A * | 4/1989 | Adams | B28B 1/08 264/333 |
| 4,823,528 | A * | 4/1989 | Faw | E04B 2/702 52/233 |
| 4,889,457 | A * | 12/1989 | Hageman | F16B 31/028 411/10 |
| 4,904,122 | A * | 2/1990 | Herbst | E21D 21/0033 405/259.1 |
| 4,988,246 | A * | 1/1991 | Yoshida | F16B 31/028 116/DIG. 34 |
| 5,007,218 | A * | 4/1991 | Bengtson | E04B 1/06 52/204.1 |
| 5,109,646 | A * | 5/1992 | Colonias | E04B 1/2608 248/300 |
| 5,138,808 | A * | 8/1992 | Bengtson | E04B 1/06 52/204.2 |
| 5,188,494 | A * | 2/1993 | Hatin | F16B 31/028 411/10 |
| 5,199,835 | A * | 4/1993 | Turner | F16B 31/028 116/212 |
| 5,280,967 | A * | 1/1994 | Varrin, Jr. | F16B 31/028 285/382.7 |
| 5,311,708 | A * | 5/1994 | Frye | E04B 7/04 52/90.1 |
| 5,335,469 | A * | 8/1994 | Stuart | E04B 1/2608 403/232.1 |
| 5,355,647 | A * | 10/1994 | Johnson | E04C 1/41 52/223.5 |
| 5,385,054 | A * | 1/1995 | Kramer | F16B 31/028 411/10 |
| 5,546,723 | A * | 8/1996 | Jones | E04B 1/0007 411/163 |
| 5,556,234 | A * | 9/1996 | Oldsen | E21D 21/0086 405/259.1 |
| 5,570,549 | A * | 11/1996 | Lung | E04C 5/125 403/306 |
| 5,596,857 | A * | 1/1997 | Besche | E04B 2/48 52/100 |
| 5,596,859 | A * | 1/1997 | Horton | E04B 2/7453 52/481.1 |
| 5,678,373 | A * | 10/1997 | Franklin | E04B 2/14 52/223.7 |
| 5,722,807 | A * | 3/1998 | Hodge | F16B 31/028 411/10 |
| 5,782,048 | A * | 7/1998 | Ramirez | E04H 9/14 52/295 |
| 5,794,921 | A * | 8/1998 | Greenberg | E04H 17/1404 256/19 |
| 5,845,444 | A * | 12/1998 | Besche | E04B 2/48 52/421 |
| 5,864,999 | A * | 2/1999 | Wallin | E02D 29/02 52/250 |
| 5,878,544 | A * | 3/1999 | McKinnon | E04B 2/8629 52/293.2 |
| 5,885,034 | A * | 3/1999 | Fergusson | E21D 21/008 405/302.1 |
| 5,890,332 | A * | 4/1999 | Skidmore | E04B 2/08 52/271 |
| 5,907,939 | A * | 6/1999 | Reichel | E04B 2/8629 52/431 |
| 5,927,918 | A * | 7/1999 | Burger | B60D 1/06 280/513 |
| 5,937,604 | A * | 8/1999 | Bowron | E04G 17/0721 248/229.16 |
| 6,014,843 | A * | 1/2000 | Crumley | E04H 9/02 403/300 |
| 6,061,986 | A * | 5/2000 | Canada | E04B 1/3555 52/293.3 |
| 6,082,063 | A * | 7/2000 | Shrive | E04C 5/122 52/223.13 |

(56) References Cited

U.S. PATENT DOCUMENTS

| | | | | |
|---|---|---|---|---|
| 6,085,476 A * | 7/2000 | Jantzi | E04B 2/84 | 52/223.7 |
| 6,098,357 A * | 8/2000 | Franklin | E04B 2/14 | 52/223.7 |
| 6,152,665 A * | 11/2000 | Wallace | F16B 31/028 | 116/212 |
| 6,161,339 A * | 12/2000 | Cornett, Sr. | E04B 7/02 | 52/23 |
| 6,178,714 B1 * | 1/2001 | Carney, Jr. | E04B 1/34315 | 52/223.7 |
| 6,195,955 B1 * | 3/2001 | Kostopoulos | E04B 2/26 | 52/583.1 |
| 6,282,859 B1 * | 9/2001 | Van Der Heijden | E04B 2/08 | 52/585.1 |
| 6,295,781 B1 * | 10/2001 | Thompson | E04B 1/2608 | 403/232.1 |
| 6,367,205 B2 * | 4/2002 | Cornett, Sr. | E04B 7/02 | 52/223.13 |
| 6,418,695 B1 * | 7/2002 | Daudet | E04B 7/022 | 52/639 |
| 6,425,718 B1 * | 7/2002 | Herr | F16B 31/028 | 411/10 |
| 6,431,797 B2 * | 8/2002 | Greenberg | 405/262 | |
| 6,560,943 B1 * | 5/2003 | Leek | E04B 7/045 | 52/295 |
| 6,662,517 B1 * | 12/2003 | Thompson | E04H 9/14 | 52/712 |
| 6,758,020 B2 * | 7/2004 | Cerrato | E04B 1/703 | 52/223.7 |
| 6,799,407 B2 * | 10/2004 | Saldana | E04B 1/2403 | 52/655.1 |
| 7,117,647 B2 * | 10/2006 | Clarke | E04B 2/702 | 403/192 |
| 7,150,132 B2 * | 12/2006 | Commins | E04B 1/26 | 411/536 |
| 7,448,178 B2 * | 11/2008 | Visone | E04B 1/2612 | 428/582 |
| 8,225,578 B2 * | 7/2012 | Azizi Ronagh | E04B 2/16 | 52/285.2 |
| 8,281,528 B2 * | 10/2012 | Clarke | E04B 2/702 | 52/223.14 |
| 8,375,671 B1 * | 2/2013 | Thrasher | E02D 31/002 | 405/262 |
| 8,382,409 B2 * | 2/2013 | Wallace | G01L 5/243 | 411/13 |
| 8,458,973 B1 * | 6/2013 | Powers, Jr. | E04C 3/20 | 249/19 |
| 8,894,328 B2 | 11/2014 | Zeitler et al. | | |
| 8,898,990 B2 * | 12/2014 | Drew | E04B 2/16 | 52/600 |
| 8,931,223 B2 * | 1/2015 | Speer | E04B 2/16 | 52/223.7 |
| 8,973,322 B2 * | 3/2015 | Heron | E04C 5/08 | 52/223.7 |
| 2001/0002524 A1 * | 6/2001 | Espinosa | E04C 5/08 | 52/293.3 |
| 2002/0014050 A1 * | 2/2002 | Van Der Heijden | E04B 2/08 | 52/585.1 |
| 2002/0041796 A1 * | 4/2002 | Greenberg | E02D 29/0283 | 405/284 |
| 2003/0200716 A1 * | 10/2003 | Manthei | E04B 2/06 | 52/565 |
| 2004/0020145 A1 * | 2/2004 | Matsufuji | E04B 2/42 | 52/223.7 |
| 2004/0074171 A1 * | 4/2004 | Wobben | E04C 3/22 | 52/223.1 |
| 2004/0079034 A1 * | 4/2004 | Leek | E04B 7/045 | 52/92.2 |
| 2005/0081465 A1 * | 4/2005 | Crumley | E04H 9/14 | 52/223.1 |
| 2005/0252118 A1 * | 11/2005 | Matsufuji | E04B 2/02 | 52/223.7 |
| 2005/0257459 A1 * | 11/2005 | Schieffer | B25B 9/00 | 52/223.7 |
| 2006/0201082 A1 * | 9/2006 | Hammer | E04C 1/395 | 52/223.5 |
| 2006/0272245 A1 * | 12/2006 | Matsufuji | E04B 2/16 | 52/223.7 |
| 2007/0056235 A1 * | 3/2007 | Kohler | E04C 2/041 | 52/223.7 |
| 2007/0107333 A1 * | 5/2007 | Marsh | E02D 29/025 | 52/223.7 |
| 2007/0245673 A1 * | 10/2007 | Cerrato | E04B 2/18 | 52/607 |
| 2008/0244993 A1 * | 10/2008 | Crumley | E04B 7/045 | 52/92.2 |
| 2009/0084056 A1 * | 4/2009 | Robertson | E04B 1/2604 | 52/396.05 |
| 2009/0094916 A1 * | 4/2009 | Crumley | E04H 9/14 | 52/293.3 |
| 2009/0107082 A1 * | 4/2009 | Commins | E04B 1/2604 | 52/745.21 |
| 2009/0313923 A1 * | 12/2009 | Bucheger | E04B 2/44 | 52/223.7 |
| 2010/0115866 A1 * | 5/2010 | Espinosa | E04B 1/2604 | 52/262 |
| 2011/0283647 A1 * | 11/2011 | Fang | E04B 2/16 | 52/565 |
| 2012/0090260 A1 * | 4/2012 | Muirhead | E04B 2/20 | 52/585.1 |
| 2012/0180412 A1 * | 7/2012 | Secrest | E02D 29/00 | 52/222 |
| 2013/0081343 A1 * | 4/2013 | Chadwick | E04B 2/702 | 52/223.14 |
| 2014/0196392 A1 * | 7/2014 | Heron | E04B 2/40 | 52/293.2 |
| 2014/0202111 A1 * | 7/2014 | Drew | E04B 2/16 | 52/589.1 |
| 2015/0204092 A1 * | 7/2015 | Crumley | E04G 23/0229 | 52/514 |
| 2016/0061248 A1 * | 3/2016 | Stewart | F16B 31/028 | 411/360 |
| 2016/0369499 A1 * | 12/2016 | Crumley | E04B 2/16 | |

OTHER PUBLICATIONS

Office Action dated Jul. 23, 2015 in U.S. Appl. No. 14/603,530.
Office Action dated Dec. 7, 2015 in U.S. Appl. No. 14/603,530.
Notice of Allowance dated Feb. 19, 2016 in U.S. Appl. No. 14/603,530.
United States Patent and Trademark Office, Office Action for U.S. Appl. No. 15/183,524, dated Jul. 16, 2018.
United States Patent and Trademark Office, Office Action for U.S. Appl. No. 15/183,524, dated Aug. 17, 2017.
United States Patent and Trademark Office, Office Action for U.S. Appl. No. 15/183,524, dated Apr. 30, 2018.
United States Patent and Trademark Office, Office Action for U.S. Appl. No. 15/252,856, dated Oct. 6, 2016.
United States Patent and Trademark Office, Office Action for U.S. Appl. No. 15/252,856, dated Jul. 11, 2017.
United States Patent and Trademark Office, Office Action for U.S. Appl. No. 15/252,856, dated Jan. 11, 2018.

* cited by examiner

SYSTEM AND METHOD FOR RETROFITTING WALLS WITH RETAINING TIES

CROSS-REFERENCE TO RELATED APPLICATIONS

Pursuant to 35 U.S.C. § 120, this application is a divisional application of U.S. patent application Ser. No. 14/603,952, filed on Jan. 23, 2015, which pursuant to 35 U.S.C. § 119(e) claimed the benefit of U.S. Provisional Patent Application Ser. No. 61/930,819, filed on Jan. 23, 2014, the entire contents of each of which are incorporated herein by this reference.

BACKGROUND (1) Field of Invention

This invention relates generally to masonry structures, and more particularly, to post-construction reinforcement and retrofitting of masonry or foam core structures exposed to extreme wind and/or seismic loading events.

(2) Background

Masonry structures predominate in residential and light commercial construction. In the case of masonry construction, the structure should be protected from uplift, shear, and overturning forces developed by wind or seismic activity. In the United States, the amount of wind and seismic activity differs with geographical location, as is designated by building codes for these areas. In many structures, reinforcing concrete masonry unit (CMU) walls resists these forces. In new construction, this is accomplished by filling vertical cells of the masonry wall with concrete and steel reinforcing bars at a given spacing. The number of reinforced cells and the strength of concrete and steel used will vary depending on the severity of the wind and/or seismic conditions in the locality of the structure, and the structure's geometry.

In many instances, the steel reinforcing is installed during the foundation and masonry installation. Steel is installed into the foundation footings as required by the loads and extends upward beyond the footings approximately two to three feet. The CMUs are then installed over the steel bars so that the steel bars are in the center of the cell (or void within the masonry unit). After the CMU wall is constructed, additional steel that extends from the foundation to the top of the wall is installed. Next, concrete is poured into the cell around the steel bars.

In existing masonry structures, it is inconvenient and sometimes impossible to install a similar system that incorporates steel reinforcement tied into the foundation or footers. Once a structure has been built, the foundation is generally inaccessible to subsequent construction additions without requiring significant time and expense. There is a need for a structural reinforcing system that resists for uplift, shear, and overturning loads that is cost efficient, installed after the foundation and CMUs have already been constructed.

The present invention meets these needs by providing a simplified, cost-effective structural system that is installed after installation of the foundation and masonry wall.

SUMMARY

The present system is intended for post-construction installation and provides existing masonry structures adequate resistance to uplift, shear, and overturning forces caused by wind and/or seismic loading events. The force resistance is accomplished by installing tension tie members at spacing required by the wind and/or seismic loads present. A continuous tension load path is developed from the top of the exterior load bearing masonry wall to the foundation by using a tension member, such as a wire rope.

The retaining tie system is installed by locating access blocks that correspond to the anchor points identified by the user's structural analysis and installing a knock-out in the side of each of the access blocks. The knock-out enables access to the top of the foundation, and an anchor hole is drilled into the top surface of the foundation. The anchor hole is then covered with a protective member to prevent intrusion of unwanted debris.

At the top of the CMU wall, an elongated base plate is seated across the top of the CMU blocks. An elongated cover plate is then placed over the base plate. An access hole is then installed through the base plate and the cover plate at each location where a tie member is to be installed. Once the access holes are placed in proper vertical alignment with the anchor holes, a bearing plate member is placed above each of the access holes. An anchor end of the tie member is then inserted through a hole in the bearing plate member. The anchor end is lowered through the vertical passageway until it is located in close proximity to the anchor hole, while the tension end remains protruding from the bearing plate member. The anchor end is then inserted into the anchor hole, and once the anchor end is properly seated inside the anchor hole, a retaining material is inserted into the anchor hole around the anchor end. The retaining material is an epoxy, grout, resin, or other such material configured to form a bond between the anchor end and the concrete of the foundation.

Once the retaining material has cured, the tension end is then tensioned to the desired tension force. In one embodiment, the tension end is tensioned by using a mechanical tensioner, such as a threaded fastener or coupler that is securely attached to the tie member. This tension force is carried by the tie member and is resisted by the reaction force of the anchor end that is securely embedded into the anchor hole. This tension force in the tie member places the CMU wall in compression, thereby stabilizing the CMU wall against lateral forces and bending moments. The tie members are any member capable of delivering the tension force needed to retain the CMU wall in compression for the design life of the tie system.

Another embodiment of the retaining tie system comprises a bracing member located in the vertical passageway. The bracing member is one of a variety of materials, such as cured in place foam, pre-cured foam, wood, grout, a bracket, or other such member. In one embodiment, the bracing member is a cured in place foam that is sprayed into the vertical passageway.

Another embodiment of the retaining tie system further comprises a bracing bracket for bracing the base plate and the cover plate to the top of the CMU wall. The bracket has a vertical member, a horizontal member, and two lateral flanges. To install the bracket, the horizontal member is inserted between adjacent blocks in the top row of the CMU wall. The vertical member is inserted such that the horizontal member is seated against the top surface of one of the blocks in the CMU wall. In this configuration, the lateral flanges extend upwardly from the top of the CMU wall, and the base plate is then placed along the top of the CMU wall and seated between the lateral flanges. The cover plate is then placed as described above, also between the lateral flanges.

Another embodiment of the retaining tie system comprises a tension washer installed above the bearing plate member. The tension washer has a body portion defining a central bolt opening, and an annular flange member depending from the body and having a slightly curved outer rim. The top surface of the tension washer is a different color than the edge and bottom surface of the washer. The rim and the bottom surface could be the same color or different colors. A threaded fastener, such as the mechanical tensioner, is passed through the opening of the tension washer and tensioned by a socket or wrench applying torque to a nut or bolt head. As the threaded fastener is tensioned, the flange member is compressed against the bearing plate member, thereby causing the curved outer rim to curl upward toward the socket and away from the bearing plate member. This rim curling action continues until the color of the edge or the bottom surface becomes visible, thereby providing a visual indicator that the requisite tension level has been achieved in the fastener or mechanical tensioner.

In another embodiment of the retention tie system, the system is used in connection with insulated concrete panel walls or other composite wall members. Composite wall members typically comprise a foam core and a protective cover layer that may or may not contribute to the structural properties of the overall panel wall member. In this embodiment, the tie members are installed as described above. In some embodiments of wall members, the foam core has vertical voids that serve as the vertical passageway. In other embodiments, the vertical passageway must be installed prior to placement of the tie members.

DETAILED DESCRIPTION

With reference to the drawings, the invention will now be described with regard for the best mode and the preferred embodiment. In general, the system disclosed herein is a retaining tie system intended for post-construction reinforcement of masonry walls and a method for installing the same. The embodiments disclosed herein are meant for illustration and not limitation of the invention. An ordinary practitioner will appreciate that it is possible to create many variations of the following embodiments without undue experimentation.

The retaining tie system disclosed herein is intended to be installed after construction of the foundation and masonry wall have been completed. The present retaining tie system could be installed in a late stage of the initial construction, or it could be installed as a retrofit to an existing building. Before installing the retaining tie system, a structural analysis is performed to determine the design loads caused by a dynamic loading event, such as the forces caused by wind or seismic events that are typical for the geographic location where the structure is located. Based on these design loads identified in the structural analysis, the structure is analyzed to determine the number, size, and anchor point locations of tie members 15 needed for the retaining tie system to operate correctly. Based on the number of needed tie members 15 and the geometry of the foundation 5 of the structure, the required spacing of the tie members 15 is determined. This spacing is the linear spacing between the tie members 15 along the concrete masonry unit (CMU) wall 10 that is required to evenly distribute along the CMU wall 10 the uplift forces caused by a dynamic loading event. Based on this spacing, the user determines the anchor points where the tie members 15 will be installed, as discussed below. That is, the nodes of the spacing pattern along the CMU wall 10 substantially coincide with the anchor points for the tie members 10.

Figure 1:
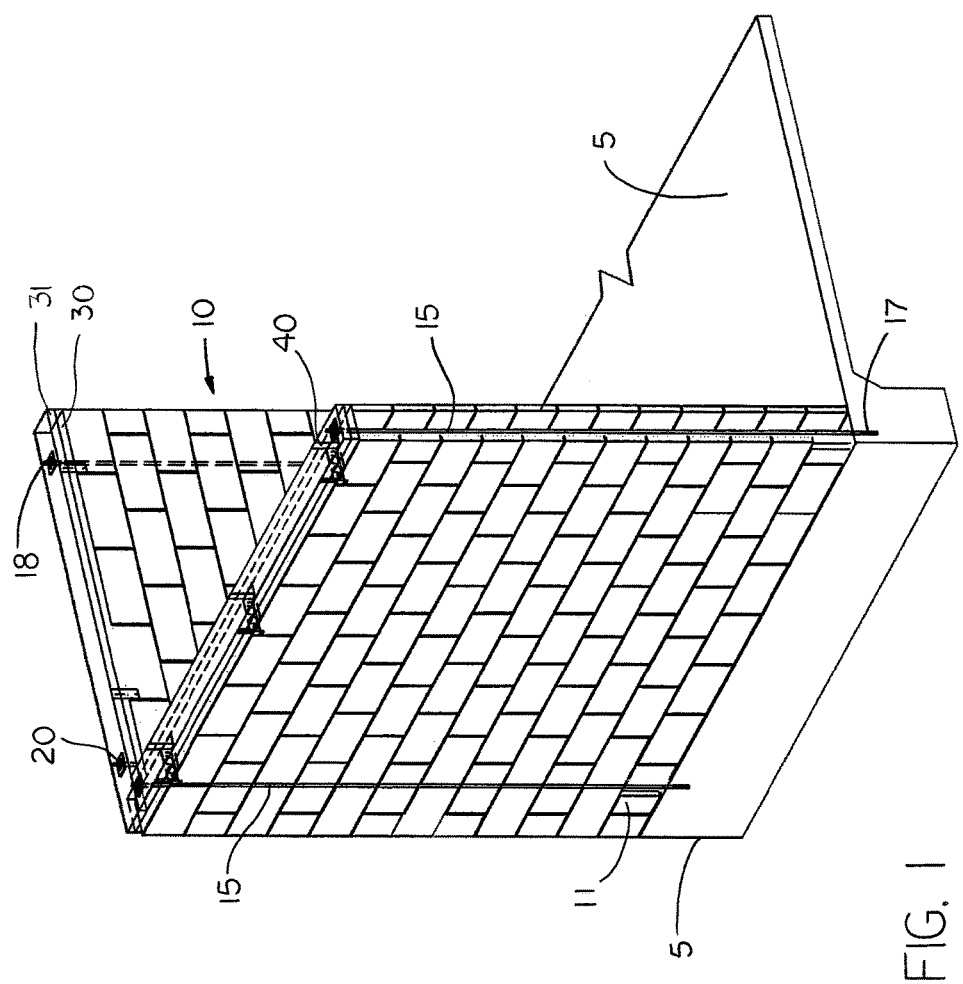
FIG. 1 is an isometric view of a portion of a typical concrete masonry unit wall retrofitted with the present retaining tie system.
Figure 2:
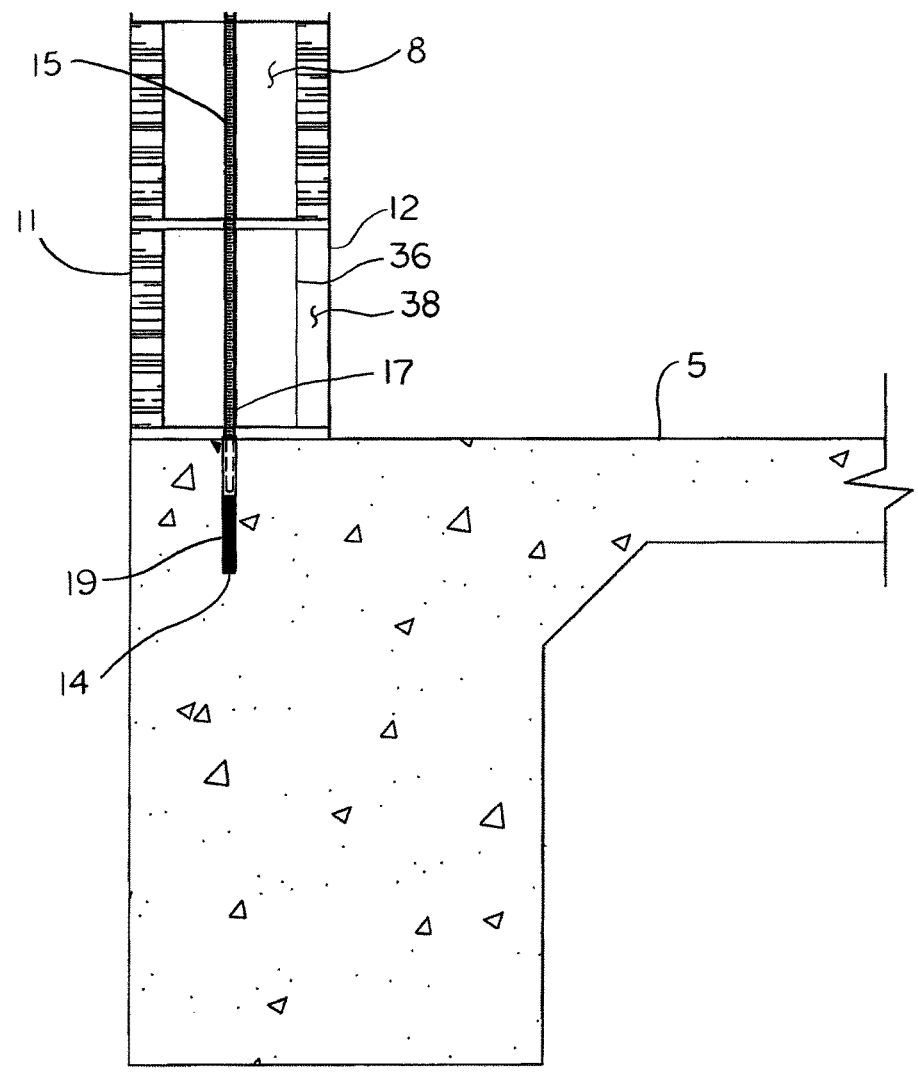
FIG. 2 is a partial cross section of a foundation interface with a CMU wall showing a typical tie member anchorage in the present retaining tie system.

Referring to FIGS. 1 and 2, the existing structure has a foundation 5 and a CMU wall 10. The foundation 5 is typically a steel reinforced concrete slab either with or without footers. The retaining tie system is installed by locating access blocks 11 that correspond to the anchor points identified by the user's structural analysis. The access blocks 11 are blocks in the CMU wall 10 that coincide most closely with the anchor points determined in the structural analysis. Once the access blocks 11 are identified, a knock-out 12 is installed in the side of each of the access blocks 11. The knock-out 12 enables access to the top of the foundation 5, and an anchor hole 14 is drilled into the top surface of the foundation 5. The anchor hole 14 is then covered with a protective member, such as tape or a removable plug, to prevent intrusion of unwanted debris.

Figure 3:
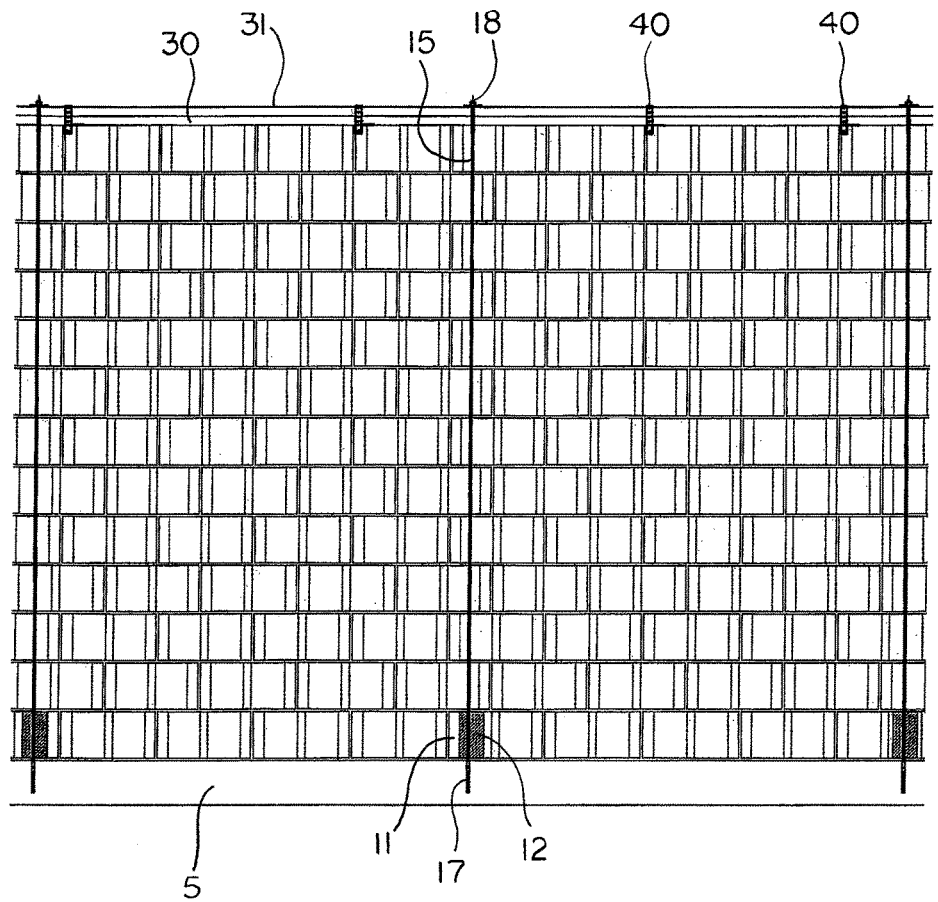
FIG. 3 is a partial cross section view of a CMU wall having the retaining tie system installed.
Figure 4:
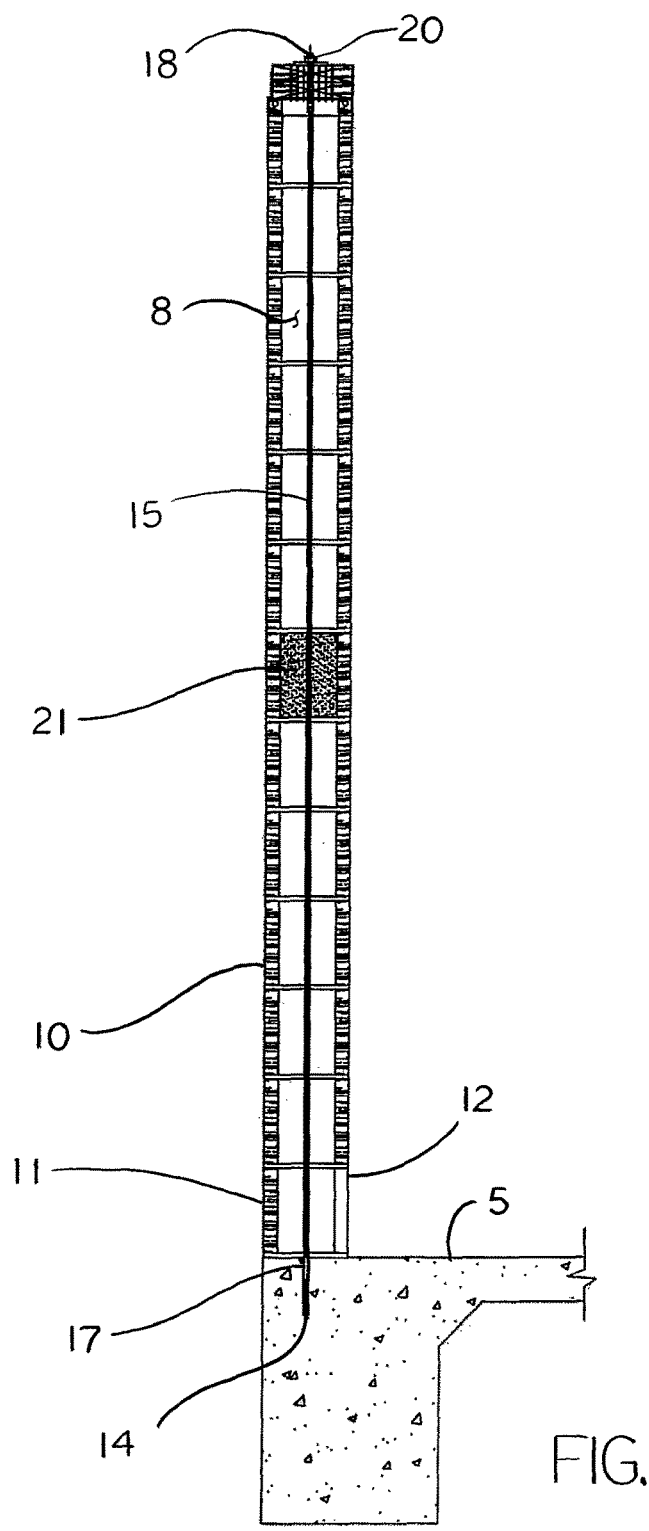
FIG. 4 is a cross section of a CMU wall having the retaining tie system installed.
Figure 5:
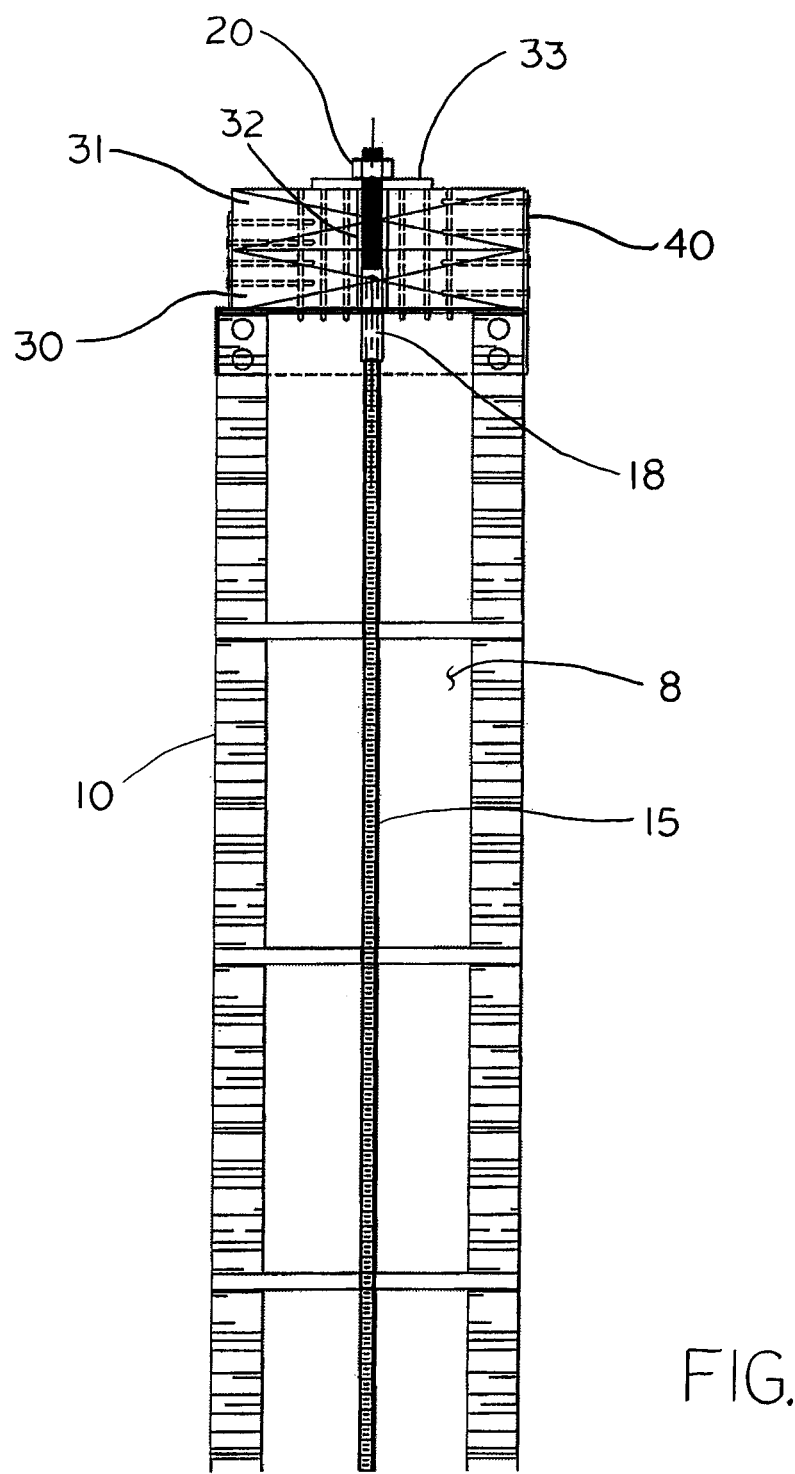
FIG. 5 is a cross section showing the anchorage of the tie member at the top of the CMU wall.

Referring to FIGS. 3-5, at the top of the CMU wall 10, an elongated base plate 30 is seated across the top of the CMU blocks. An elongated cover plate 31 is then placed over the base plate 30. An access hole 32 is then installed through the base plate 30 and the cover plate 31 at each location where a tie member 15 is to be installed. Alternately, the respective plate members 30, 31 could be pre-drilled with the access holes 32 before the plates are seated on the CMU wall 10. Once the plate members 30, 31 are properly seated, the access holes 32 must be placed in substantial vertical alignment with the anchor holes 14 such that the installed tie member 15 passes through a substantially direct vertical passageway from the anchor hole 14 to the access hole 32 with minimal disruption or interference. An ordinary practitioner will appreciate that this vertical passageway 8 in this embodiment is the vertically aligned voids in the individual blocks in the CMU wall 10. The plates 30, 31 are members providing enough rigidity to distribute the compressive force caused by the tie members 15 across the top of the CMU wall 10. The plates 30, 31 could be wood, composite, polycarbonate, metal, or other material. In one embodiment the base plate 30 is pressure treated wood, and the cover plate 31 is wood. As used herein, "substantial vertical alignment" means a vertical alignment that permits installation of the tie member 15 without debilitating interference from vertically misaligned members or components.

Once the access holes 32 are placed in proper vertical alignment with the anchor holes 14, a bearing plate member 33 is placed above each of the access holes 32. The bearing plate member 33 has a receiving hole that is placed in substantial vertical alignment with the access hole 32 such that the tie member 15 is able to pass through the bearing plate member 33 and into the access holes 32 as described below. The purpose of the bearing plate member 32 is to distribute along the cover plate 31 the compressive force caused by a properly installed tie member 15. The bearing plate member 33 should be rigid enough to laterally distribute the compressive force applied to the cover plate 31. In one embodiment, the bearing plate member 33 is metal, such as steel, and the cover plate 31 is wood.

After placement of the bearing plate member 33, an anchor end 17 of the tie member 15 is inserted through the hole in the bearing plate member 33. The anchor end 17 is lowered through the vertical passageway until it is located in close proximity to the anchor hole 14, while the tension end 18 remains protruding from the bearing plate member 33. The anchor hole 14 is accessed through the knock-out 12, and the protective member is removed from the anchor hole 14. The anchor end 17 is then inserted into the anchor hole 12, and once the anchor end 17 is properly seated inside the anchor hole 14, a retaining material 18 is inserted into the anchor hole 14 around the anchor end 17. The retaining material 19 is an epoxy, grout, resin, or other such material configured to form a bond between the anchor end 17 and the concrete of the foundation 5. Alternately, the retaining material 19 could be inserted into the anchor hole 14 before the anchor end 17 is inserted. The anchor hole 14 should be pre-drilled deeply enough to enable insertion of the anchor end 17 of the tie member 15 to a length that allows for the retaining material 19 to fully bond to the anchor end 17 and the concrete of the foundation 5. The length of the bond between the anchor end 17 and the retaining material 18 should be long enough to develop the full tensile strength of the tie member 15. The retaining material 19 should be allowed ample time to cure, as required. Alternate types of anchor devices could be used to secure the anchor end 17 inside the anchor hole 14, such as threaded concrete anchors.

Once the retaining material 19 has cured, the tension end 18 is then tensioned to the desired tension force. In one embodiment, the tension end 18 is tensioned by using a mechanical tensioner 20, such as a threaded fastener or coupler that is securely attached to the tie member 15. This tension force is carried by the tie member 15 and is resisted by the reaction force of the anchor end 17 securely embedded into the anchor hole 14. This tension force in the tie member 15 places the CMU wall 10 in compression, thereby stabilizing the CMU wall against lateral forces and bending moments.

The tie members 15 are any member capable of delivering the tension force needed to retain the CMU wall 10 in compression for the design life of the tie system. The tie members 15 could be rods, cables, strands, wire rope, or other material.

In one embodiment of the retaining tie system, after the appropriate tension force is applied to the tie member 15, a screen member 34 is placed over the knock-out 12 and a fill material is used to cover the screen member 34. The fill material 38 could be drywall, stucco, or other such material that enables the user to conceal the existence of the knock-out 12. One embodiment of the fill material 38 comprises a waterproofing material to protect the tie member 15 from corrosion caused by water leaking through the fill material 38.

Figure 6:
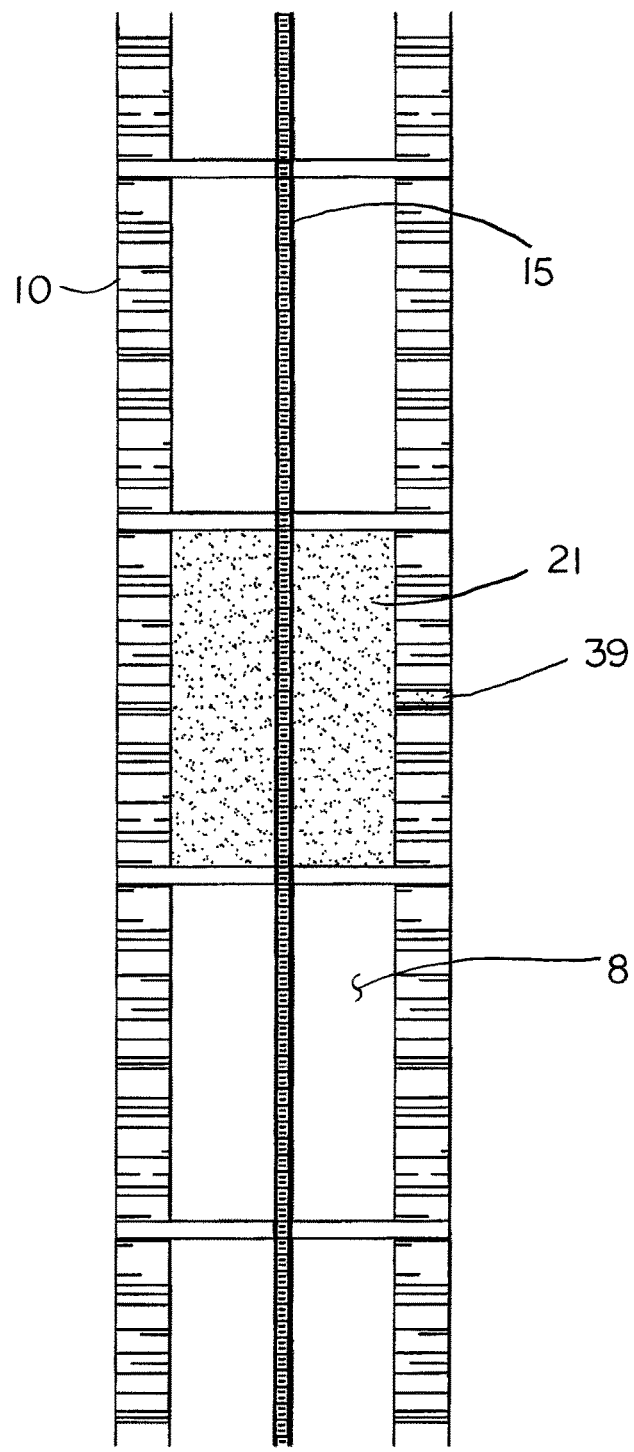
FIG. 6 is a cross section of a CMU wall showing the bracing member.

Another embodiment of the retaining tie system, shown in FIG. 6, further comprises a bracing member 21 located in the vertical passageway 8. The bracing member 21 is snugly positioned between the inside surface of the blocks of the CMU wall 10 and the surface of the tie member 15. The bracing member 21 is any member that is capable of retaining the tie member 15 in an alignment that passes closely to the centerline of the vertical passageway 8 as the CMU wall 10 bends. Retaining this alignment prevents the CMU wall 10 from buckling under the compressive force of the tie members 15 when the CMU wall 10 experiences significant bending deflection. The bracing member 21 is one of a variety of materials, such as cured in place foam, pre-cured foam, wood, grout, a bracket, or other such member. In one embodiment, the bracing member 21 is a cured in place foam that is sprayed into the vertical passageway 8. In this embodiment, an access port 39 is installed in one of the blocks in the CMU wall 10, and the foam is sprayed through the access port 39 and into the vertical passageway 8 after the tie member 15 has been fully installed. The access port 39 is then concealed by using a screen member and fill material in a manner similar to that described above for the knock-out 12.

In another embodiment, the bracing member comprises a tubular sleeve configured for vertically receiving the tie member 15. For example, the tubular sleeve could be a segment of PVC pipe placed in the vertical passageway 8 and retained in place by a bonding agent, such as grout, epoxy, a bracket, or the like.

Figure 7:
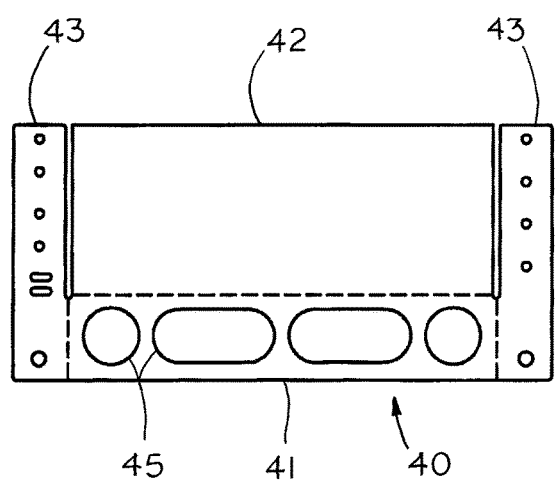
FIG. 7 is a plan view showing the bracket member stamped into a flat metal plate before being bended into the three dimensional shape of the bracket.
Figure 8:
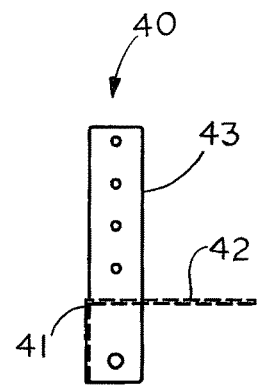
FIG. 8 shows a side view of the bracket member.
Figure 9:
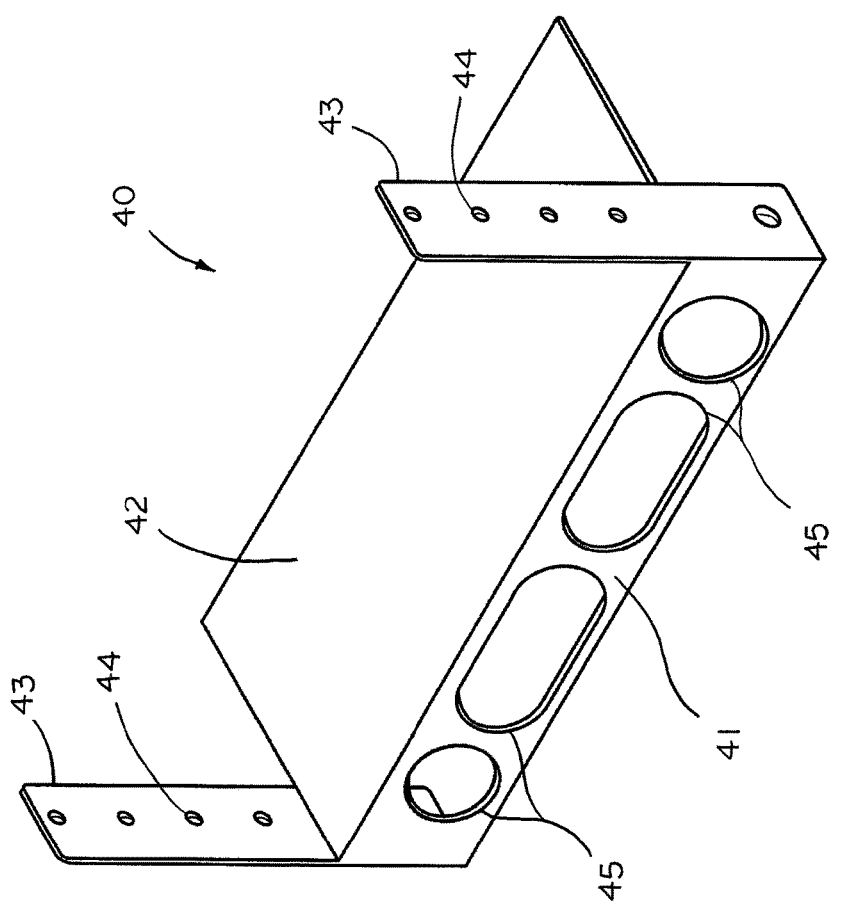
FIG. 9 is an isometric view of a typical bracket member.
Figure 10:
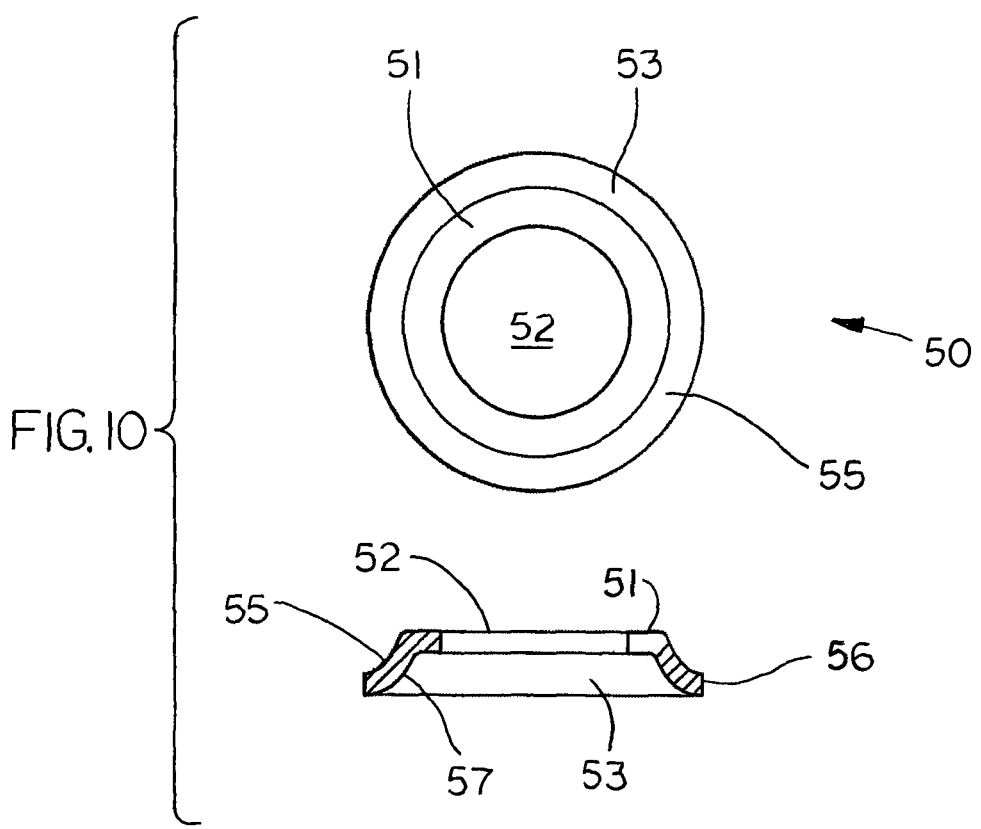
FIG. 10 shows a top view and a cross section of the tension washer.
Figure 11:
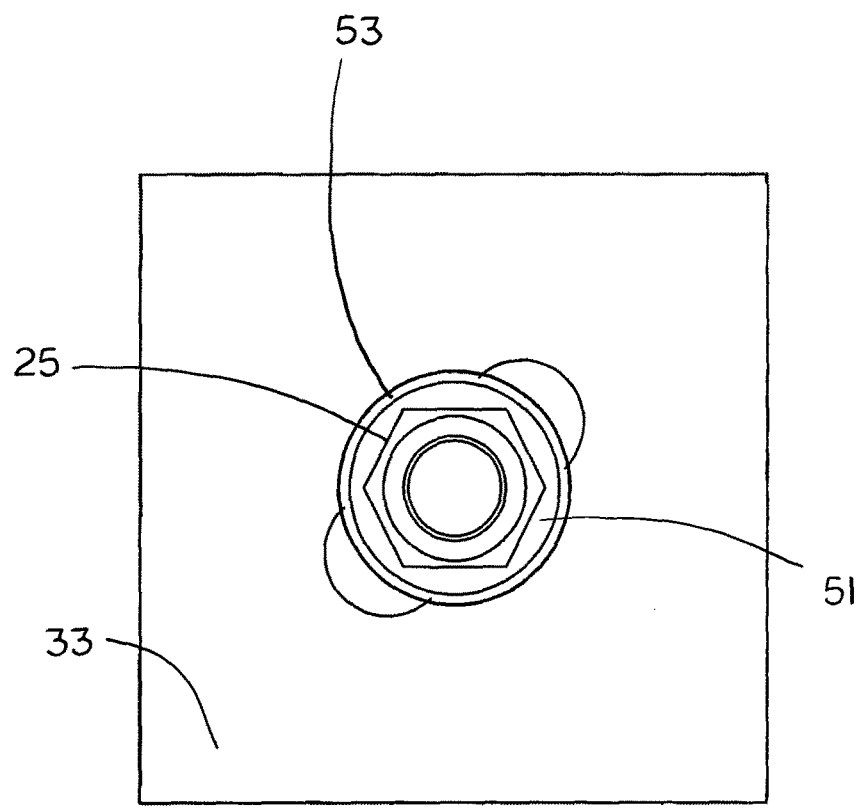
FIG. 11 is a plan view showing the tension washer connected to the flat bearing surface by a hexagonal bolt.
Figure 12:
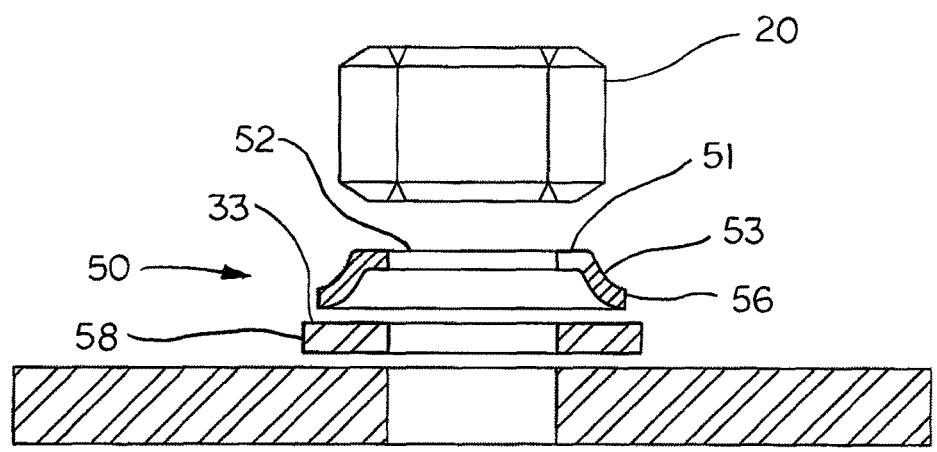
FIG. 12 is a cross section of the tension washer, spacing washer, and flat bearing surface, showing the proximate location of a typical hex bolt head.
Figure 13:
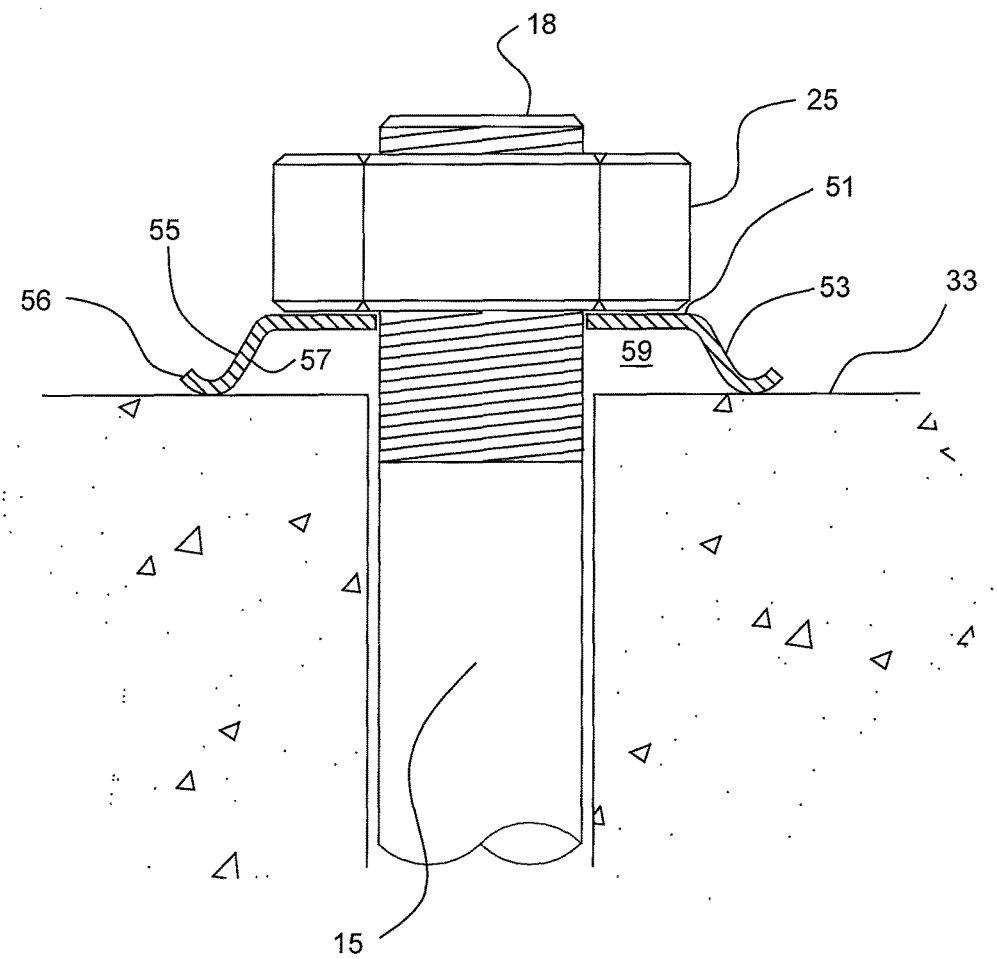
FIG. 13 shows a nut connected to a tension end of a tie member and compressing the tension washer against the flat bearing surface. The tension washer and flat bearing surface are shown in cross section.

Referring to FIGS. 7-9, another embodiment of the retaining tie system further comprises a bracing bracket 40 for bracing the base plate 30 and the cover plate 31 to the top of the CMU wall 10. The bracket 40 has a vertical member 41, a horizontal member 42, and two lateral flanges 43. To install the bracket 40, the horizontal member 42 is inserted between adjacent blocks in the top row of the CMU wall 10. The vertical member 41 is forced between the CMU blocks, and the grout travels through one or more passages 45 in the vertical member 41 to assist in retaining the bracket 40 in place. In another embodiment, the step of insertion may require removal of the grout between the blocks to enable initial placement of the vertical member 41 between blocks. The vertical member 41 in inserted such that the horizontal member 42 is seated against the top surface of one of the blocks in the CMU wall 10. In this configuration, the lateral flanges 43 extend upwardly from the top of the CMU wall 10. Any grout removed during placement of the vertical member 41 should be replaced with new grout. The vertical member 41 comprises one or more passages 45 to enable wet grout to flow through the vertical member 41, thereby securing the bracket 40 in place after the grout has cured. The base plate 30 is then placed along the top of the CMU wall 10 and seated between the lateral flanges 43. The cover plate 31 is then placed as described above, also between the lateral flanges 43. To secure the bracket 40 to the plates 30, 31, mechanical fasteners such as nails, screws, or other anchors are installed through the plates 30, 31, through the horizontal member 42, and into the top of the CMU wall 10. In one embodiment of the bracket 40, the lateral flanges 43 comprise pre-installed holes 44 for receiving mechanical fasteners such as nails or screws. In another embodiment, the holes 44 are formed when the flanges 43 are penetrated by mechanical fasteners, such as by nails driven by a nail gun. In this embodiment, the final step of securing the plates 30, 31 to the bracket 40 is installing mechanical fasteners through the holes 44 in the lateral flanges 43 and into the plates 30, 31. The brackets 40 can be installed along the top of the CMU wall 10 at a spacing as needed to resist the lateral forces acting on the plates 30, 31.

Referring to FIGS. 10-13, the tension washer 50 has a substantially planar body portion 51 defining a central bolt opening 52, and a deformable annular flange member 53 depending from the body 51. The tension washer 50 has a top surface 55, an edge 56, and a bottom surface 57. The deformable annular flange member 53 is curved from its base to the outer edge 56 such that the flange member 53 is concave upward toward the body 51. The bottom surface 27 of the flange member is placed against a flat bearing surface, such as the bearing plate member 33 or a flat washer or spacer 58, so that prior to loading the tension washer 50 the body 51 is separated from the flat bearing surface 33 by a space 59.

A tension end 18 is passed through the opening 52 of the tension washer 50 and tensioned by a socket or a wrench applying torque to a tension adjustment device 25, such as a nut or bolt head. As the tie member 15 is tensioned, such as by tightening the nut 25, the flange member 53 is compressed against the flat bearing surface 33, thereby causing the flange member 53 to expand outwardly by sliding along the flat bearing surface 33. During this action, the flange member 53 deforms by the edge 56 curling upward toward the nut 25 and away from the flat bearing surface 33 (See FIG. 13). Plastic deformation can occur in the outer fibers of the flange member 53 (the fibers along the bottom surface 27), thereby causing unrecoverable deformation and upward curling of the flange member 53. As the flange member 53 slides along the flat bearing surface 33 and curls upward, the body 51 moves toward the flat bearing surface 33, thereby closing the space 59. The flange member 53 thus has an unloaded shape and a first deformed shape.

The tension washer 50 is placed by fitting the central opening 52 over the tension end 18 of the tie member 15. Prior to loading, the annular flange 53 is in its unloaded shape, and the user sees only the top surface 55 without the edge 56 or bottom surface 57 being visible. As the tie member 15 is tensioned and the tension washer 50 is compressed against the flat bearing surface 33, flange member 53 takes on its first deformed shape under a first compression load. In the first deformed shape, the edge 56 becomes visible when the magnitude of the tension force in the tie member 15 reaches a first magnitude. As further tension is applied, the flange member 53 takes on a second deformed shape under a second compression load when the magnitude of the tension force in the tie member 15 reaches a second magnitude, where the first magnitude is lower than the second magnitude. In the second deformed shape, the flange member 53 is severely curved, and the bottom surface 57 under the edge 56 becomes visible to the user. Thus, the edge 56 and the bottom surface 57 provide a two-stage visual indication of tension magnitude in the tie member 15 corresponding to the first deformed shape and the second deformed shape, respectively.

In one embodiment, the top surface 55 of the tension washer 50 is a different color than the edge 56 and bottom surface 57 of the washer 50. For example, the top surface 55 comprises a first color, and the edge 56 and bottom surface 57 comprise a second color. The tension washer 50 is placed on the tension end 18 and against the flat bearing surface 33. Prior to loading, the flange member 53 remains in its unloaded shape, and the user sees only the first color of the top surface 55 without the second color being visible. As the tension washer 50 is loaded, the edge 56 curling action begins, and it continues to the first deformed shape as described above, where the second color of the edge 56 or the bottom surface 57 becomes visible to the user. In this embodiment, the visibility of the second color provides a one-stage visual indicator that a pre-determined magnitude of tension level has been achieved in the tie member 15.

In another embodiment, the top surface 55, edge 56, and bottom surface 57 comprise a first color, a second color, and a third color, respectively. As the tension washer 50 is loaded, the edge 56 curling action continues as described above until the flange member 53 reaches its first deformed shape and the second color of the edge 56 becomes visible, thus indicating a first magnitude of tension force in the tie member 15. As the tie member 15 is tensioned further, the edge 56 curling action continues until the flange member 53 reaches its second deformed shape and the third color of the bottom surface 57 becomes visible to the user, thus providing a visual indication that a second magnitude of tension force has been reached in the tie member 15. The first magnitude is lower than the second magnitude. The visibility of the second color and the third color provides a two-stage visual indicator corresponding to two different magnitudes of tension achieved in the tie member 15—the first magnitude and the second magnitude.

The tension washer 50 is comprised of metal, plastic, or some other material that is capable of deforming properly under the required tension loads. In applications requiring a high tension force, the tension washer 50 comprises a material with a relatively high elastic modulus, such as steel, so that the tension washer 50 does not prematurely deform. In applications requiring lighter tension loads, the tension washer 50 comprises material of a lower elastic modulus, such as die cast metal or plastic, so that the tension washer 50 deforms properly under the lighter load. In another embodiment, proper sizing of the annular flange member 53 is a manner of ensuring that the tension member 50 deforms properly under the required tension load. The thickness of the annular flange member 53 is adjusted according to the required tension load. The annular flange member 53 is either thickened or thinned for larger or smaller tension loads, respectively. Also, the width of the annular flange member 53 can be made wider or more narrow as desired. The width of the flange member 53 affects its elasticity, with narrow flange members 53 being stiffer, and wider flange members 53 being less stiff.

In another embodiment, the edge 56 curls away from the flat bearing surface 33 until the edge 56 contacts the socket or wrench, thereby providing a physical indication to the user that the threaded fastener or mechanical tensioner 20 is properly tensioned.

The tension washer 50 can be used in a method of determining the magnitude of tension in the tension tie member 15 as follows. The tension washer 50 of any of the foregoing embodiments is installed by placing the central opening 52 over the tension end 18 of a tension tie member 15 such that the bottom surface 57 is placed in contact with the flat bearing surface 33. The tension adjustment device 25 is threaded onto the tension end 18 of the tie member 15. The tension adjustment device is adjusted to compress the tension washer 50 against the flat bearing surface 33 such that the annular flange member 53 begins to deform by curling upward toward the body portion 51, thereby causing separation between the edge 56 of the flange member 53 and the flat bearing surface 33. The step of adjusting the tension adjustment device can be stopped when the edge becomes visible to the user, the bottom surface becomes visible to the user, the first color becomes visible to the user, or the second color becomes visible to the user. A first magnitude of tension force in the tie member 15 is identified and reached when the edge 56 becomes visible to the user, or when the first color becomes visible to the user, as described above. Similarly, a second magnitude of tension force in the tie member 15 is identified and reached when the bottom surface 57 or the second color becomes visible to the user.

Figure 14:
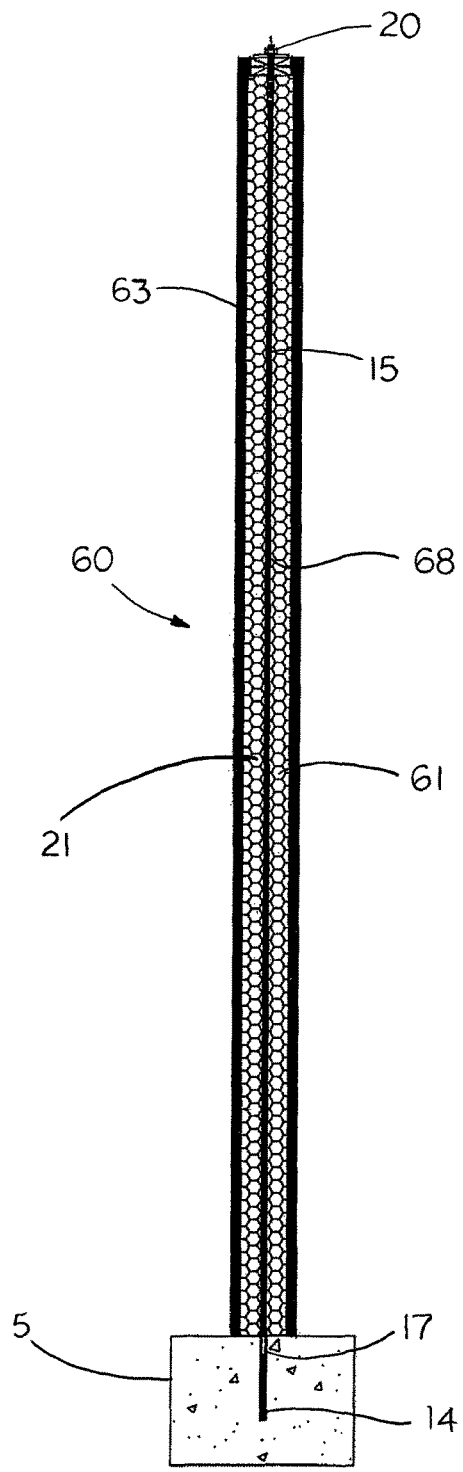
FIG. 14 is a cross section of the retaining tie system installed in a foam core panel wall.
Figure 15:
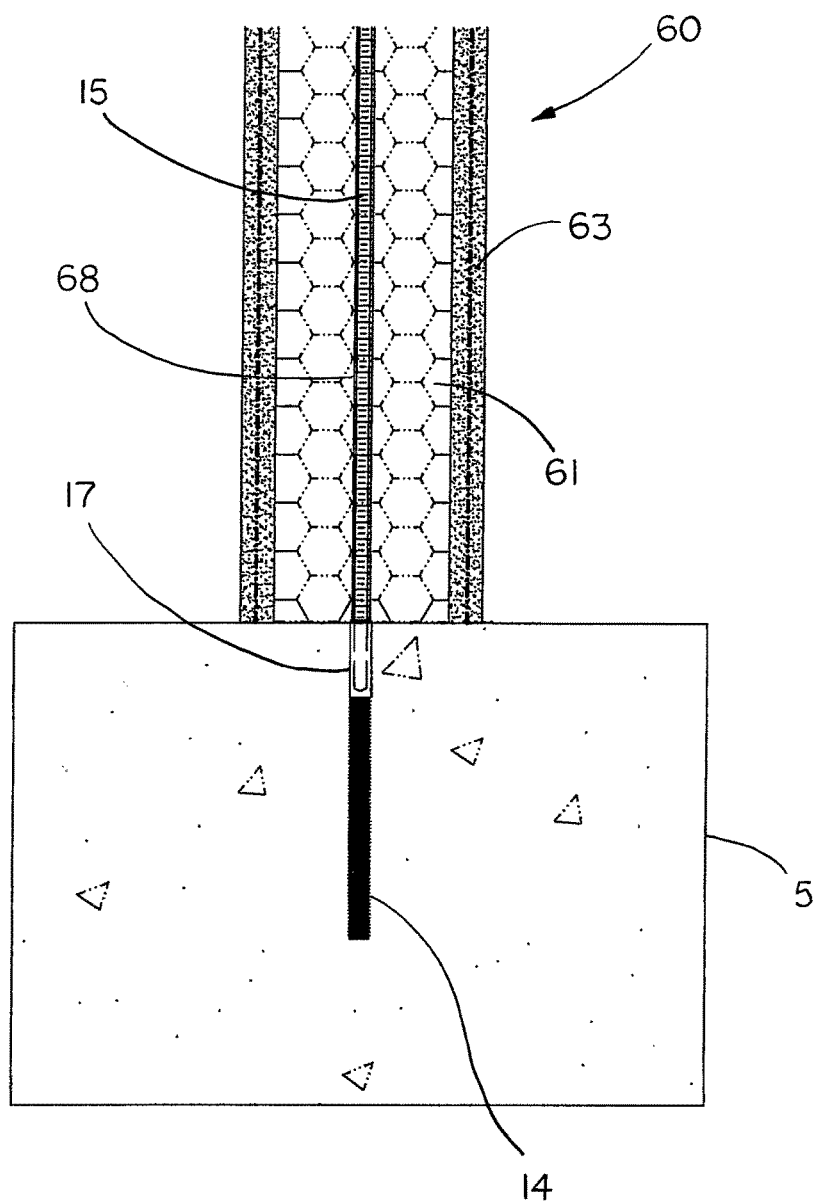
FIG. 15 shows a cross section of the tie member anchorage in a typical foam core panel wall.
Figure 16:
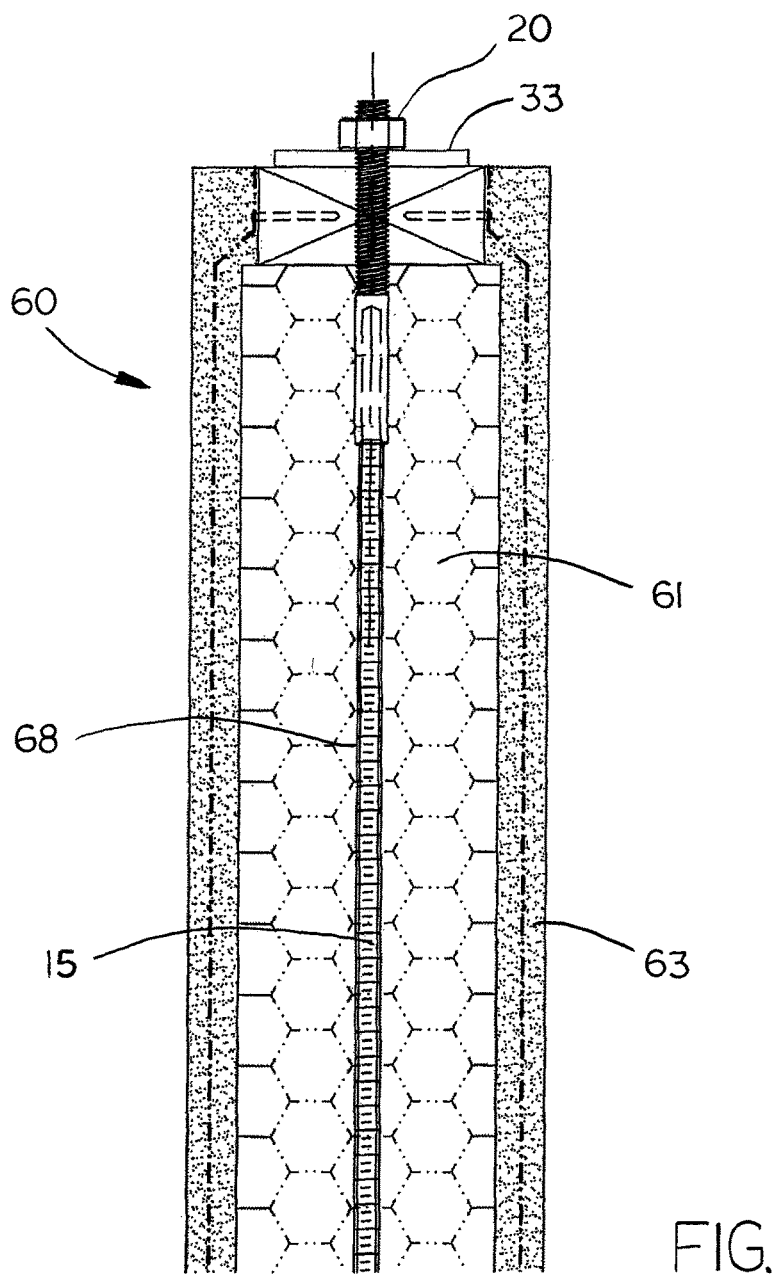
FIG. 16 shows a cross section of the top of a typical foam core panel wall and the mechanical tensioner.

In another embodiment of the retention tie system, shown in FIGS. 14-16, the system is used in connection with insulated concrete panel walls or other composite wall members 60. Composite wall members typically comprise a foam core 61 and a protective cover layer 63 that may or may not contribute to the structural properties of the overall panel wall member 60. In this embodiment, the tie members 15 are installed as described above. However, the vertical passageway 68 may or may not need to be installed. In some embodiments of wall members 60, the foam core 61 has vertical voids that serve as the vertical passageway 68. In other embodiments, the vertical passageway 68 must be installed prior to placement of the tie members 15. In these embodiments, the vertical passageway 68 is installed by drilling or cutting through the foam core 61 to bore out the vertical passageway 68. In other embodiments, the vertical passageway 68 is located at the vertical wall seams between wall members 60 (not shown). For example, the vertical edges of the wall members 60 could be used to sandwich the tie members 15 between them. In another embodiment, the vertical edges of the wall members 60 comprise concave edges that form the vertical passageway 68 when mated with the adjacent wall member 60. In many embodiments, the foam core 61 acts as the bracing member 21, which precludes the need for post-installation of a separate bracing member 21.

Figure 17:
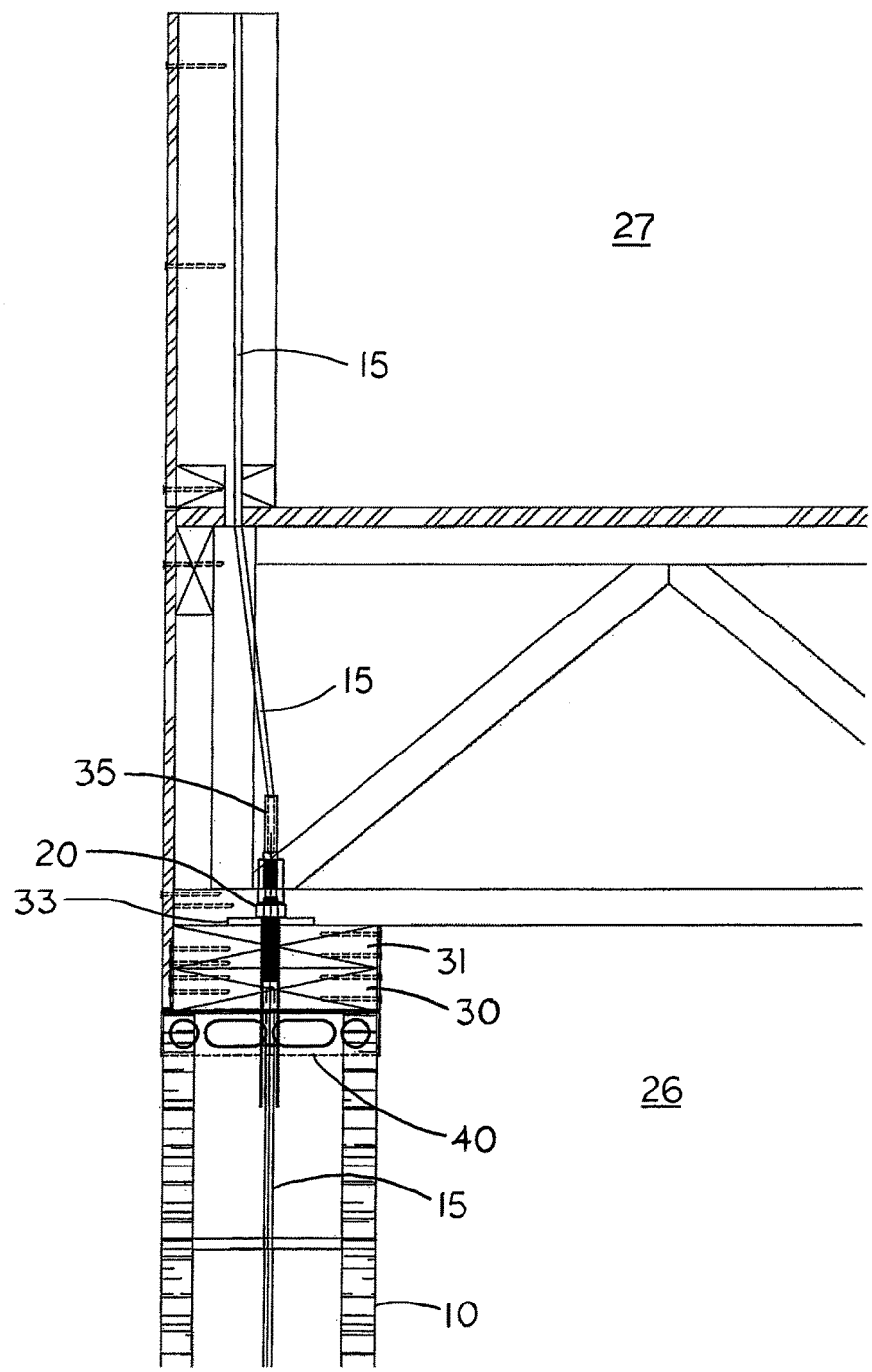
FIG. 17 is a cross section showing the interface between stories of a multiple story building having the retaining tie system installed.

In any of the foregoing embodiments, the retention tie system can be configured to extend into multistory construction, as shown in FIG. 17. A coupler 35 connects the tie member 15 of the lower story 26 with the tie member 15 of the upper story 27, and the coupler 35 acts as the lower anchor for the tie member 15 of the upper story 27.

The foregoing embodiments are merely representative of the retaining tie system and not meant for limitation of the invention. For example, persons skilled in the art would readily appreciate that there are several embodiments and configurations of the retaining tie system members that will not substantially alter the nature of the system. Likewise, elements and features of the disclosed embodiments could be substituted or interchanged with elements and features of other embodiments, as will be appreciated by an ordinary practitioner. Consequently, it is understood that equivalents and substitutions for certain elements and components set forth above are part of the device described herein, and the true scope of the invention is set forth in the claims below.

I claim:

1. A system for post-construction reinforcement of the walls of a pre-existing structure, the system comprising:
   a tie member having an anchor end and a tension end, said tie member configured for passage through a vertical passageway in a pre-existing constructed wall of an existing structure, the wall supported by a pre-existing foundation and having a top, the anchor end configured for embedment into the pre-existing foundation;
   a base plate with a first set of access holes, said base plate configured for placement along the top of the wall;
   a cover plate with a second set of access holes, the cover plate configured for placement on the base plate at an orientation where the first set of access holes, second set of access holes, and vertical passageway are in substantial vertical alignment;
   a bearing plate member having a receiving hole, said bearing plate member configured for placement on the cover plate at an orientation where the receiving hole is placed in substantial vertical alignment with the second set of access holes; and
   a bracing member configured for placement inside the vertical passageway such that the bracing member retains the tie member in close proximity to the centerline of the vertical passageway;
   a tension washer configured for placement between a mechanical tensioner and the bearing plate member, the tension washer comprising:
      a body portion defining a central opening; and
      a deformable annular flange member downwardly depending from the body portion, the flange member having a curved portion terminating at an outer edge configured to be placed in contact with the bearing plate member;
      a top surface comprising a first color and a bottom surface comprising a second color, the first color being different than the second color, the bottom surface being adapted for placement against the bearing plate member such that the outer edge contacts the bearing plate member, the outer edge placed in a substantially perpendicular orientation with respect to the bearing plate member; and
      wherein the curved portion of the annular flange member is adapted to plastically deform into a first plastically deformed shape under a first compression load, the first plastically deformed shape comprising the outer edge separated from contact with the bearing plate member such that the second color disposed on the deformable annular flange provides a visual indication of the first compression load.

2. The system of claim 1, wherein the bracing member comprises a tubular sleeve retained within the vertical passageway by a bonding agent, where the tubular sleeve is configured for vertically receiving the tie member.

3. The system of claim 1, wherein:
   the vertical passageway comprises the vertical alignment of voids in a plurality of concrete masonry units; and
   the bracing member is disposed in contact with the tie member at location in proximity to the midpoint of the tie member, the bracing member disposed within one of the voids in the plurality of concrete masonry units that form the vertical passageway.

4. The system of claim 3, wherein the bracing member comprises a tubular sleeve retained within the vertical passageway by a bonding agent, where the tubular sleeve is configured for vertically receiving the tie member.

* * * * *